(12) United States Patent
Hourticolon et al.

(10) Patent No.: US 6,619,571 B1
(45) Date of Patent: Sep. 16, 2003

(54) METHOD FOR EMPTYING FIXED-BED REACTORS

(75) Inventors: Roland Hourticolon, Leichlingen (DE); Gerd Goebel, Cologne (DE); Franz-Josef Carduck, Haan (DE); Juergen Latzel, Wuppertal (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/731,965

(22) Filed: Dec. 7, 2000

Related U.S. Application Data

(63) Continuation of application No. 09/566,613, filed on May 9, 2000, now abandoned, which is a continuation of application No. 09/054,359, filed on Apr. 2, 1998, now abandoned, which is a continuation of application No. 08/670,917, filed on Jun. 26, 1996, now abandoned.
(60) Provisional application No. 60/000,620, filed on Jun. 30, 1995.

(51) Int. Cl.⁷ .............................................. B02C 19/12
(52) U.S. Cl. ........................ 241/1; 241/24.11; 241/301; 241/79
(58) Field of Search .......................... 241/1, 301, 24.11, 241/79

(56) References Cited

U.S. PATENT DOCUMENTS

| | | | | |
|---|---|---|---|---|
| 2,245,554 A | * | 6/1941 | Court ............................ | 241/1 |
| 4,123,108 A | * | 10/1978 | Lavon ........................... | 241/1 |
| 5,212,891 A | * | 5/1993 | Schuermann et al. ......... | 241/1 |

* cited by examiner

*Primary Examiner*—Mark Rosenbaum
(74) *Attorney, Agent, or Firm*—John E. Drach

(57) ABSTRACT

A method for the removal of a spent catalyst from a fixed-bed reactor is disclosed, wherein a suction hose, in which a high pressure hose comprising a high-pressure nozzle is integrated, is introduced into the reactor, the catalyst is then size-reduced by water under high pressure passed through the nozzle, the catalyst/water mixture is removed under suction and is optionally collected in a separator.

17 Claims, 3 Drawing Sheets

SCHNITT A-A

SCHNITT B-B

METHOD FOR EMPTYING FIXED-BED REACTORS

BENEFIT OF EARLIER FILING DATE UNDER 37 CFR 1 78(A)(4)

This application is a continuation of Ser. No. 09/566,613, filed May 9, 2000, now abandoned, which is a continuation of Ser. No. 09/054,359, filed Apr. 2, 1998, now abandoned, which is a continuation of Ser. No. 08/670,917, filed Jun. 26, 1996, now abandoned, which claims the benefit of Ser. No. 60/000,620, filed Jun. 30, 1995.

BACKGROUND OF THE INVENTION

1. Field of the Invention

This invention relates to a method for removing a spent catalyst from a fixed-bed reactor, more particularly from a tube-bundle reactor.

2. Description of the Related Art

Deactivated catalysts in fixed-bed reactors have to be removed from the reactor at predetermined time intervals. The catalysts may be present in the reactor both in powder form and in the form of hard lumps through disintegration, sintering or caking. The fixed-bed reactors are normally emptied by opening of the reactor base and destroying the caked catalyst with water under high pressure introduced from below. Cleaning is carried out in an open system. Catalyst sludge and rinsing water leave the reactor without any control. Even if the reactor is emptied with care, contamination of the area around the reactor with catalyst sludge cannot be avoided. The catalyst collected in open containers has to be transferred to suitable drums for disposal as waste.

Accordingly, the problem addressed by the present invention is to provide an improved process of the type mentioned at the beginning which would not have any of these disadvantages.

SUMMARY OF THE INVENTION

According to the invention, the solution to this problem is characterized in that a suction hose, in which a high pressure hose comprising a high-pressure nozzle is integrated, is introduced into the reactor, the catalyst is then size-reduced by water under high pressure passed through the nozzle, the catalyst/water mixture is removed under suction and is optionally collected in a separator.

3. BRIEF DESCRIPTION OF THE DRAWINGS

DETAILED DESCRIPTION OF THE INVENTION

One example of embodiment of the invention is described in detail in the following with reference to FIGS. 1 to 5 of the accompanying drawings.

Figure 1:
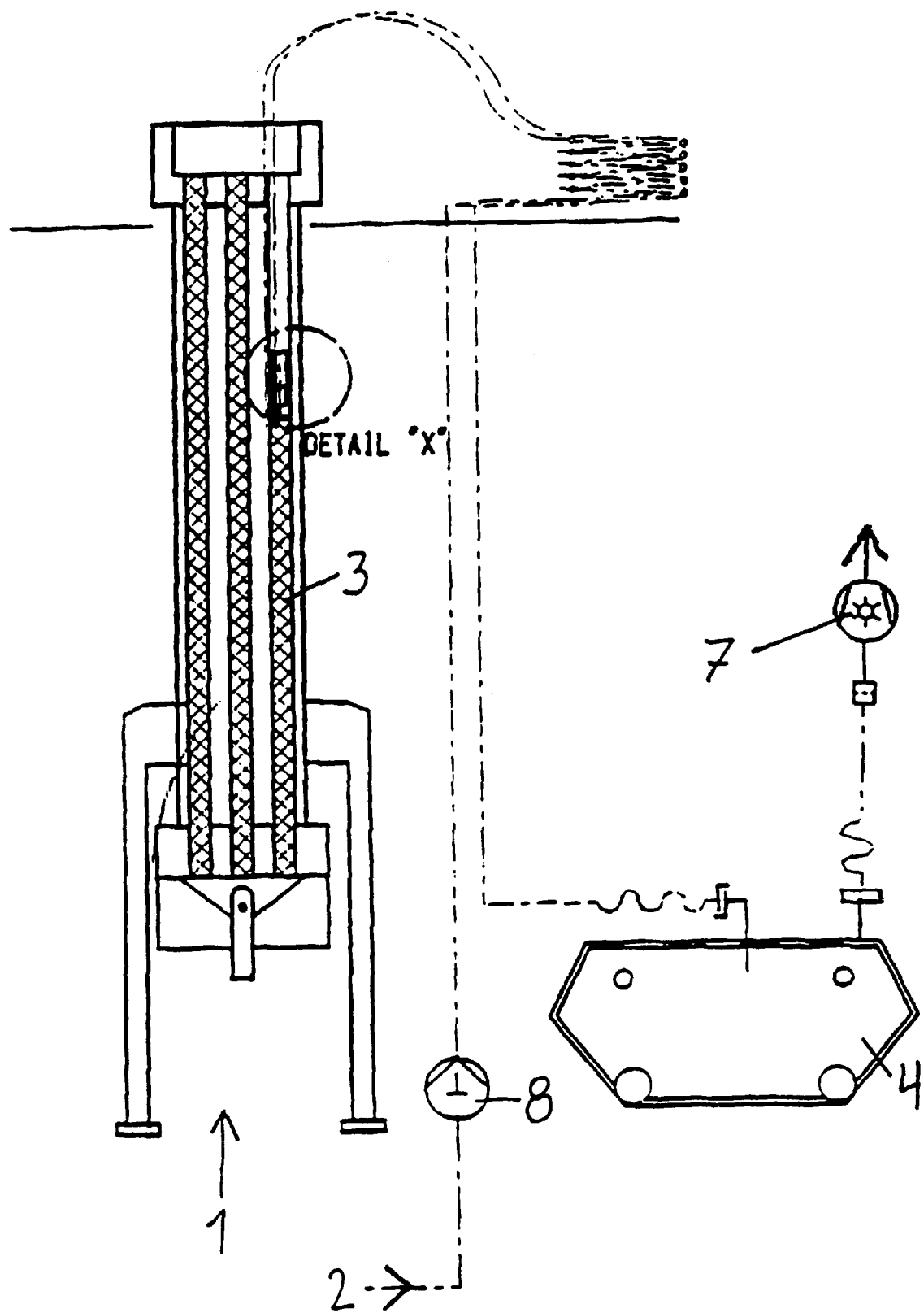
FIG. 1 depicts a tube-bundle reactor having an apparatus for removing the catalyst/water mixture.
Figure 2:
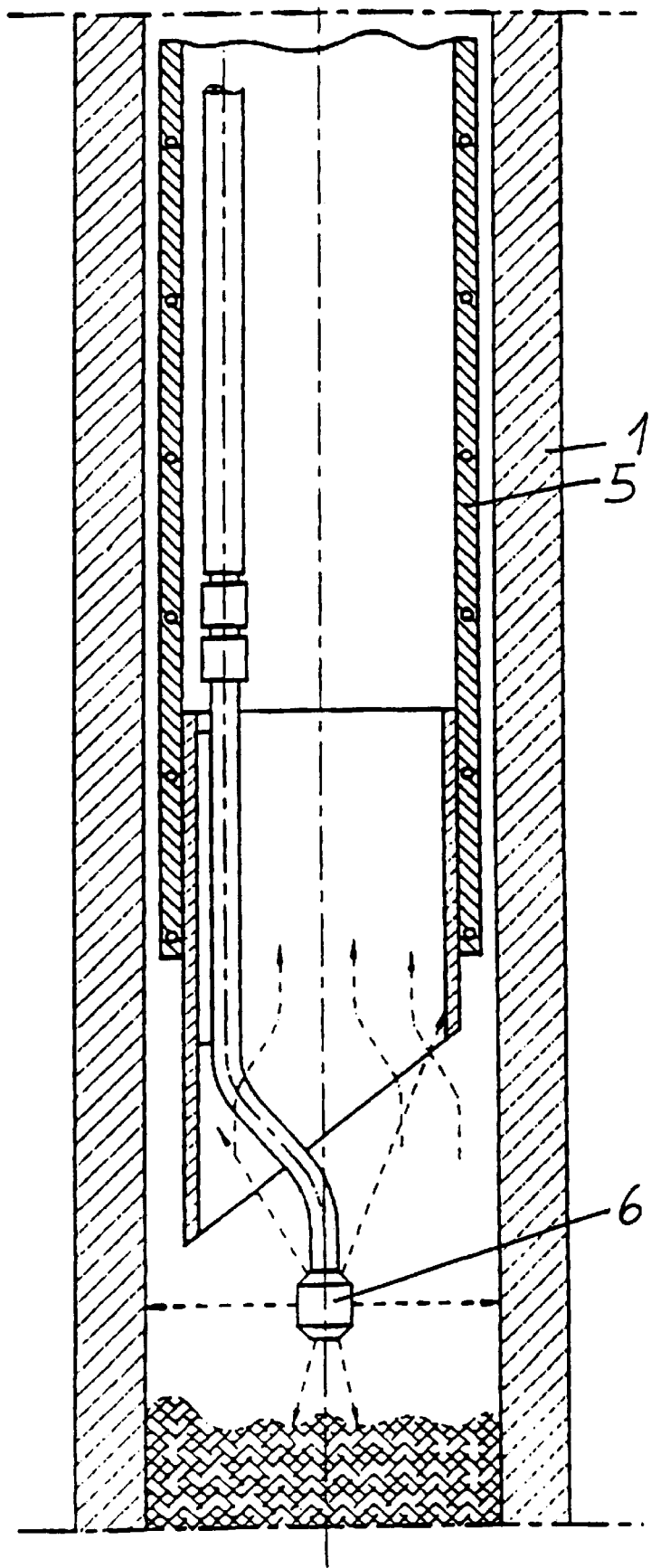
FIG. 2 is an enlargement of the catalyst/water removal apparatus.
Figure 3:
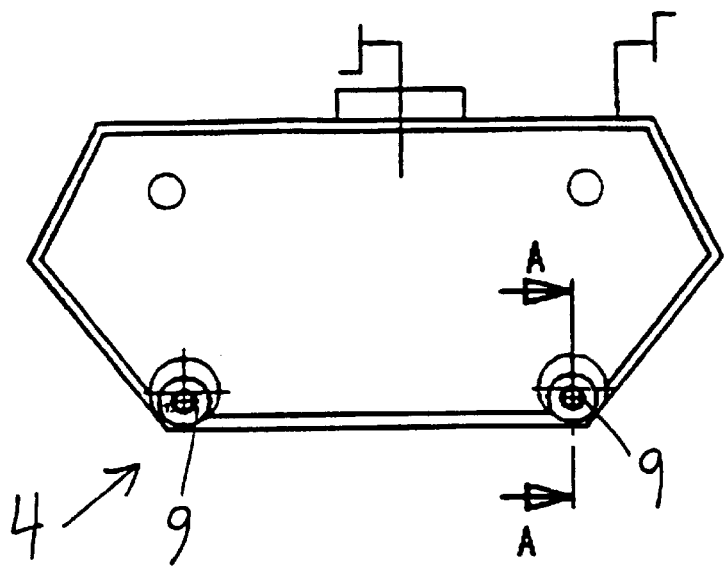
FIGS. 3–5 depict various arrangements of the filters in the separating unit.
Figure 4:
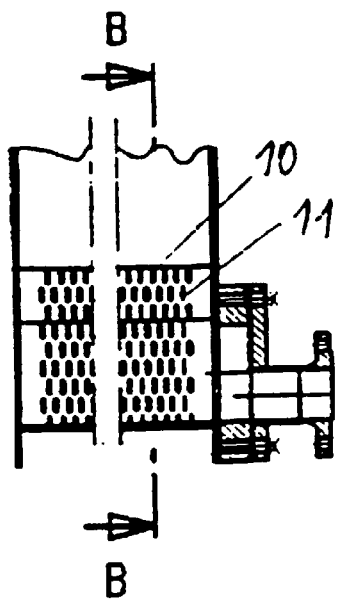
Figure 5:
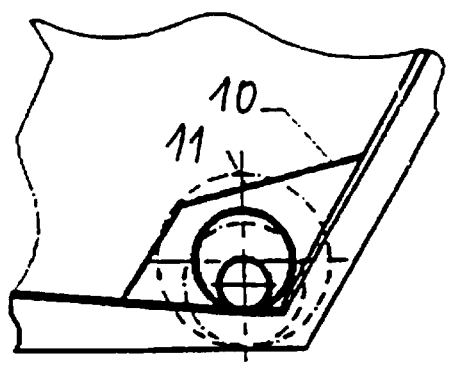

According to the invention, a fixed-bed reactor, for example a tube reactor (1), is emptied with water (2) under pressure to break up caked catalyst (3). At the same time, the catalyst/water mixture is removed under suction into a suitable separator (4) in a closed system (FIG. 1). The arrangement for emptying fixed-bed reactors 1 consists of a suction hose (5) with an integrated high-pressure water nozzle (6), a solid/liquid separator (4), optionally with an integrated filter for separating the rinsing water (2), a vacuum generator (7) (water ring pump, Roots fan or the like) and a high-pressure pump (8) for producing water under high pressure (FIGS. 1 and 2). To empty the reactor (fixed-bed reactors of the shaft or tube-bundle reactor type), only the upper reactor flange or a manhole is opened and the suction hose with the integrated high-pressure nozzle is introduced. The configuration of the high-pressure nozzle is such that the water under high pressure destroys caked catalyst, in addition to which a drawing-in effect of particular advantage in the case of tube reactors is also obtained through rebounding of the water jet. When the suction hose is withdrawn, the supply of water under pressure is interrupted. The catalyst/water mixture is separated from the air stream in a vacuum-tight separator (4). Vacuum-tight containers, authorized road transport containers (capacity 4–16 m$^3$) or even silos with and without discharge systems may be used as separators. The separators may also be provided with a filter (9) for separating the rinsing water (FIGS. 3 to 5). The filter may even consist, for example, of a metal cloth (10) and/or perforated metal plate (11). In this way, water can easily be removed from the catalyst sludge before transport.

The following operating data is proposed for the safe operation of the suction system:

| | |
|---|---|
| Suction rate in the suction hose: | 5–30 m/s |
| Suction pressure: | 100–1000 mbar |
| Water under pressure: | 50 to 1000 bar. |

In a test arrangement for the suction emptying of a pilot tube reactor for the hydrogenation of methyl esters, the best results were obtained with the following operating data:

| | |
|---|---|
| Suction rate: | 10 m/s |
| Suction pressure: | 800 mbar |
| Water under pressure: | 500 bar |
| Water consumption: | 30 l/min. |

A reaction tube with a catalyst volume of 20 liters could be emptied and cleaned in about two minutes.

What is claimed is:

1. A method for the removal of a spent catalyst from a fixed-bed reactor comprising the steps of:
   (a) size-reducing the spent catalyst by contact with water passed through a high pressure nozzle, to produce a spent catalyst/water mixture, and
   (b) removing the spent catalyst/water mixture from said fixed-bed reactor by suction,
      wherein said high pressure nozzle is attached to a high pressure hose, said high pressure hose and high pressure nozzle being integrated into a suction hose, said suction hose providing a means for suction in step (b).

2. The method of claim 1 wherein the spent catalyst/water mixture removed in step (b) is collected in a separator.

3. The method of claim 2 wherein said separator is a vacuum tight, road transport container.

4. The method of claim 2 wherein said separator further comprises a filter to effect the removal of water from said spent catalyst/water mixture.

5. The method of claim 1 wherein the fixed-bed reactor is a tube-bundle reactor.

6. A method for the removal of a spent catalyst from a fixed-bed reactor comprising the steps of:
   (a) size-reducing the spent catalyst by contact with water under high pressure to produce a spent catalyst/water mixture, and
   (b) removing the spent catalyst/water mixture from said fixed-bed reactor by suction.

7. The method of claim 6 wherein the spent catalyst/water mixture removed in step (b) is separated into a water component and a spent catalyst component.

8. A method for the removal of a spent catalyst from a fixed-bed reactor comprising the steps of:
   a) size-reducing the spent catalyst by contact with water to produce a spent catalyst/water sludge, and
   b) removing the spent catalyst/water sludge from said fixed-bed reactor, and
   c) collecting the spent catalyst/water sludge in a separator.

9. The method of claim 8 wherein said separator further comprises a filter to effect the removal of water from said spent catalyst/water sludge.

10. A method for the removal of a spent catalyst from a fixed-bed reactor comprising the steps of:
    (a) size-reducing the spent catalyst by contact with water under pressure to produce a spent catalyst/water mixture, and
    (b) removing the spent catalyst/water mixture from said fixed-bed reactor by suction.

11. A method for the removal of a spent catalyst from a fixed-bed reactor comprising the steps of:
    (a) size-reducing the spent catalyst by contact with water in a closed system to produce a spent catalyst/water mixture, and
    (b) removing the spent catalyst/water mixture from said fixed-bed reactor, wherein only the upper flange or a manhole is opened in the fixed bed reactor.

12. A method for the removal of a spent catalyst from a fixed-bed reactor comprising the steps of:
    a) contacting the spent catalyst with water to produce a spent catalyst/water mixture, and
    b) removing the spent catalyst/water mixture from said fixed-bed reactor wherein only the upper flange is opened in the fixed-bed reactor.

13. A method for the removal of the solid contents of a reactor comprising the steps of
    (a) contacting the solid contents with water in a closed system to produce a solid/water mixture, and
    (b) removing the solid/water mixture from the rector.

14. The method of claim 13 wherein step (a) is carried out with water under high pressure.

15. The method of claim 13 wherein the solid/water mixture from step (b) is collected in a separator.

16. The method of claim 15 wherein the solid/water mixture is separated into a solid component and a water component.

17. A method for the removal of the solid contents of a reactor comprising the steps of:
    (a) contacting the solid contents with water to produce a solid/water mixture, and
    (b) removing the solid/water mixture from the reactor by the use of suction.

* * * * *